UNITED STATES PATENT OFFICE.

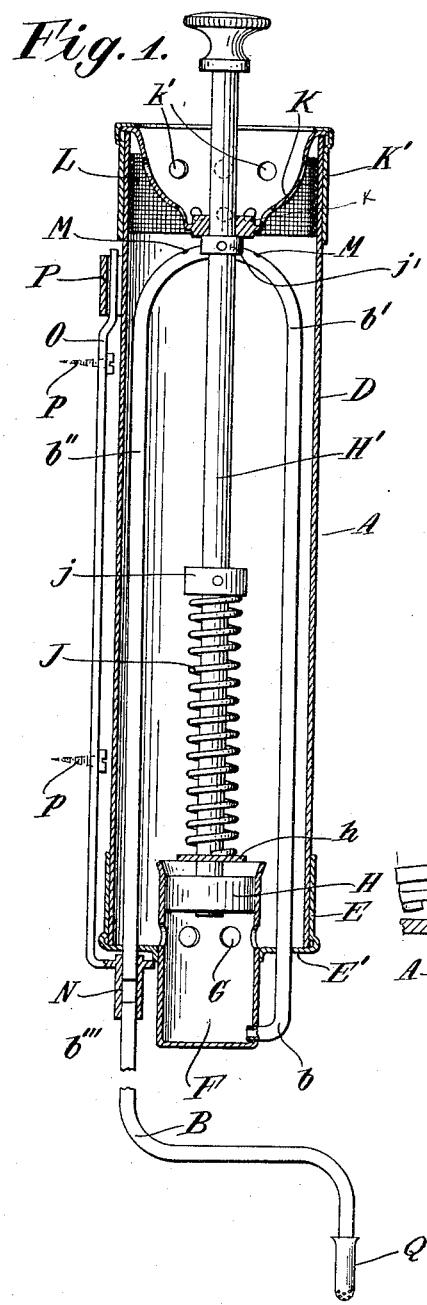

FRANK A. DECKER, OF NEW YORK, N. Y.

SANITARY DEVICE.

1,385,985.   Specification of Letters Patent.   Patented Aug. 2, 1921.

Application filed November 3, 1917.  Serial No. 200,001.

*To all whom it may concern:*

Be it known that I, FRANK A. DECKER, a citizen of the United States, residing in the city, county, and State of New York, have invented certain new and useful Improvements in Sanitary Devices, of which the following is a specification, reference being had to the accompanying drawings, illustrative of one particular embodiment of my invention.

Among the objects of my invention are to provide a simple, inexpensive, easily operated and efficient disinfecting and deodorizing apparatus, and in particular to provide in such apparatus a device having these advantages and which can be easily filled and which will with certainty and simplicity deliver a measured quantity of concentrated disinfectant liquid predetermined, for proper disinfecting of a predetermined amount of water, and to produce a proper mixture. Also to simultaneously provide deodorizing apparatus; and to produce such a device that can be readily installed in conjunction with the other parts of the apparatus and be adapted for manual and intermittent operation when desired, so as to provide a most simple, efficient and sanitary apparatus.

In the particular embodiments shown in the accompanying drawings forming a part hereof:

Figure 1 illustrates a preferred form of the reservoir and supply device in vertical section.

Fig. 2 is an elevation showing an installation of the apparatus.

Fig. 3 is a modified installation, in elevation, with fragmentary section.

Fig. 4 is an elevation, with fragmentary section, of a supply reservoir with details modified.

Fig. 4$^a$ is a section of a detail applicable to the form shown in Fig. 4.

Fig. 5 is a fragmentary view of the upper bend of a supply pipe modified in detail, in part section.

As shown, A is a reservoir for disinfectant with means for measuring and forcing a measured supply of disinfectant through a system. B is a supply pipe leading from the reservoir to the vessel C containing water to be disinfected, which, as shown in Fig. 2, leads from the reservoir to a lower level, and in Fig. 3 the disinfectant is forced from a lower level to a higher level for delivery of the charge.

In Fig. 4 the reservoir and pump A' has the supply pipe B' leading outside the cylinder of the reservoir, in which case suitable means is shown for injecting or spraying a predetermined portion of the disinfectant into the top of the reservoir, and in modified form is shown in Fig. 4$^a$.

The reservoir and supply pump comprise a cylinder D and detachable lower cap E, into which is secured a pump barrel F, with openings G on the inner side of the head E' of the cap E. The plunger H fits the pump barrel F and is operated by a piston rod H', which passes through the guide $h$, which supports the spring J held between said guide and support $h$ and an adjustable collar $j$, on the piston rod. Near the top the piston rod has another adjustable collar $j'$, which limits the upward movement of the piston rod to prevent the piston from being pulled out of the barrel. This collar $j'$ engages a guide box $k$ in a cap K detachably secured to the top of the cylinder D, screwed on or otherwise detachably held as by a collar K'. The member K is bowled and has perforations $k'$ and on the interior of the cylinder near the top, preferably in close proximity to these openings, a wick or fabric L is secured.

The tube B has a section $b$ leading from the bottom of the pump barrel through the lower cap E' to a bend $b'$ at the top, and turns downward inside of the cylinder D, as at $b''$, and leaves the reservoir again at the bottom. In the bend $b'$ there are orifices M—M.

Where the supply tube $b''$ leaves the reservoir a coupling N surrounds it and provides for the junction of an outside section of the tube $b'''$. This coupling sleeve N may be a part of the supporting bracket O, adapted to be held to the wall or other stationary member by screws $p$—$p$, and having its upper end engaging the cylinder by a slip joint under the strap P. The exit end of the supply pipe B is provided with a spray nozzle Q.

In the form shown in Fig. 4 the supply pipe leaves the bottom of the pump barrel and extends upward on the outside of the cylinder D, and near the top an offset R is provided with an orifice $r$ leading into the top of the cylinder D, while a coupling sleeve S, suitably secured to the top of A', provides for joining the supply pipe section B' with such further pipe connections as may be desired. In Fig. 4ª the outside pipe B is indicated in the form in which the top bend of a siphon arrangement of the piping is provided, having a lateral pipe R' with an orifice r' leading into the top of the cylinder A'.

It will thus be seen that in the particular form of embodiment of my invention which I have illustrated and specifically described, the reservoir A can be readily filled by anyone, without additional devices, by pouring the concentrated disinfectant into the top, and by pressure on the knob at the top of the piston rod a predetermined amount of the contained liquid is projected through the tubing to the final orifice Q, where it is sprayed into a non-portable receptacle containing water, with which it mixes forming the necessary disinfecting mixture. In passing through the bend b' of the tube, the passage of the liquid down the side b'' and beyond, in the arrangement shown in Fig. 2, would constitute a siphon tending to draw a continuous stream of the liquid out of the reservoir, but this is prevented by the small openings M—M near the top of the bend, the size of which openings is made smaller than the section of the interior of the tubing b', so that only a portion of the liquid projected through the tubing is emitted from these small openings M, which, however, will break the siphon and permit the predetermined amount of liquid that has passed the top of the bend, to flow through the balance of the tube to the exit where it mingles with the water, while on the upward leg of the bent tube the liquid will settle back and find its level with the main body of liquid in the reservoir, leaving the device immediately ready for the next use.

The orifices at the top of the bend are so arranged that the fractional portion of the liquid emitted from them is projected about the top of the cylinder D, on the inside, and particularly to impinge upon the fabric L, thereby moistening the fabric with the concentrated disinfectant thus providing for evaporation to a predetermined extent, as desired, for the purpose of effecting deodorizing. The amount of liquid so sprayed into the top of the reservoir is more than sufficient for deodorizing purposes and passes through the air in the top of the reservoir and falls back to the main body of the liquid, thereby effecting a circulation of the liquid upon each operation of the device, which circulation is of sufficient extent to keep the liquid properly mixed and uniform in strength.

The collar j' on the piston rod H', is so arranged that when the cap K is in position the piston rod cannot rise beyond a point which would allow the piston H to pass out of its proper position at the top of the pump barrel F. The spring J can be adjusted as to tension, by the collar j, with a set screw, but if desired the spring may be made longer and engage the stop collar j'. As shown in Fig. 5, a small valve T may be added to the pipe at the upper bend of the siphon, so as to relieve the air-pressure and break the siphon. Any form of air valve may be used, preferably one which will close when the liquid passes through the tube, and which thereafter opens quickly to admit ample air to break the siphon.

As shown in Fig. 3 the device is set into the floor, and the supply pipe leads from it upward through the base plate on the floor, properly protecting the tube which passes up to and over the edge of the reservoir containing water to be disinfected. In this case the arrangement for atomizing and deodorizing, as shown in Fig. 5, could be used, and the proper proportion of pump capacity is arranged to deliver the desired quantity of concentrated disinfectant at the final orifice, irrespective of what might be siphoned back to the reservoir or fall back through the vertical leg of the pipe.

The supporting device, as shown in Fig. 1, may be a strap secured to a wall or other object by screws, with which it remains permanent and the reservoir A is then adjusted to it by inserting the end of the pipe b', projecting at the bottom, into the coupling N, at the same time that the top of the bracket O slides into the clip or joint P, on the cylinder D.

Thus in the preferred form my device is a complete, self-contained reservoir embodying means for delivering in measured quantity of concentrated liquid in the required, predetermined amount, to the water to be disinfected, and at the same time spray a portion of the liquid in a manner that will effectually deodorize, and at the same time will circulate the liquid in a desired manner, while all of the parts are inclosed and coöperate in a manner that avoids complication, or any liability to breakage or interruption of operation. It lends itself particularly to operation by anyone in the simplest possible manner, and in all is simple and cheap to manufacture, and requires no skill to replenish or keep in service.

While various modifications may be made in arrangement and in the construction of parts and in the material used in the manufacture of the device, it will be understood I do not limit myself to the particular form or forms herein shown and described, but what I claim and desire to secure by Letters Patent is:

1. A disinfectant apparatus comprising a disinfectant reservoir, openings to charge the same, means for circulating disinfectant therein and aerating means actuated by the circulation of said liquid and means to diffuse the disinfectant vapor through the top of the reservoir and connections for delivering a measured quantity of said liquid exterior to said reservoir.

2. An article of the character described comprising a cylinder, an integral pump associated with said cylinder, means to supply measured charge to said pump and a delivery pipe from said pump to an external basin, an intermediate orifice in said pipe adapted to diffuse a portion of said liquid into the top of said cylinder, a fabric lined perforated top to said cylinder located in proximity and adapted to receive the diffused liquid.

3. An article of the character described comprising a cylinder, an integral pump associated with said cylinder, means to supply measured charge to said pump and a delivery pipe from said pump to the ultimate receptacle, an intermediate orifice in said pipe adapted to spray a portion of said liquid within said cylinder, a removable perforated top for said cylinder located in proximity to the intermediate orifice and affording an outlet for the vapor of the sprayed liquid.

Signed at New York, this 31 day of October, 1917.

FRANK A. DECKER.

Witnesses:
H. MUCHMORE,
HERMANN F. CUNTZ.